(12) United States Patent
Oteo et al.

(10) Patent No.: US 10,565,413 B2
(45) Date of Patent: *Feb. 18, 2020

(54) OPTICAL IMAGING DEVICES AND METHODS

(71) Applicant: Cognex Corporation, Natick, NY (US)

(72) Inventors: Esther Oteo, Aachen (DE); Laurens Nunnink, Simpelveld (NL); Matthew D. Engle, Watertown, MA (US); Carl W. Gerst, Clifton Park, NY (US)

(73) Assignee: COGNEX CORPORATION, Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/005,008

(22) Filed: Jun. 11, 2018

(65) Prior Publication Data

US 2019/0138774 A1 May 9, 2019

Related U.S. Application Data

(63) Continuation of application No. 15/246,682, filed on Aug. 25, 2016, now Pat. No. 9,996,721.

(51) Int. Cl.
| | | |
|---|---|---|
| *G06K 7/10* | (2006.01) | |
| *G06K 19/06* | (2006.01) | |
| *G06K 7/14* | (2006.01) | |
| *G06K 7/00* | (2006.01) | |
| *G02B 17/00* | (2006.01) | |
| *G02B 27/00* | (2006.01) | |
| *G02B 27/14* | (2006.01) | |

(52) U.S. Cl.
CPC ....... *G06K 7/10831* (2013.01); *G02B 17/008* (2013.01); *G02B 27/0018* (2013.01); *G02B 27/141* (2013.01); *G06K 7/10722* (2013.01); *G06K 7/10841* (2013.01); *G06K 19/06046* (2013.01)

(58) Field of Classification Search
CPC ... B06K 7/10; G06K 7/14; G06K 9/00; G06K 5/00; G06K 7/00; G06F 17/00; G03B 7/08; G02B 5/08
USPC .... 235/454, 462.11, 462.17, 462.24, 462.35, 235/462.41, 462.42, 375
See application file for complete search history.

(56) References Cited

U.S. PATENT DOCUMENTS

| | | | |
|---|---|---|---|
| 6,055,100 A * | 4/2000 | Kirk | G02B 27/2292 353/38 |
| 6,114,712 A | 9/2000 | Dvorkis et al. | |
| 7,336,197 B2 | 2/2008 | Ding et al. | |
| (Continued) | | | |

FOREIGN PATENT DOCUMENTS

EP 1469413 A1 10/2004

*Primary Examiner* — Edwyn Labaze
(74) *Attorney, Agent, or Firm* — Quarles & Brady LLP

(57) ABSTRACT

The present invention relates to optical imaging devices and methods for reading optical codes. The image device comprises a sensor, a lens, a plurality of illumination devices, and a plurality of reflective surfaces. The sensor is configured to sense with a predetermined number of lines of pixels, where the predetermined lines of pixels are arranged in a predetermined position. The lens has an imaging path along an optical axis. The plurality of illumination devices are configured to transmit an illumination pattern along the optical axis, and the plurality of reflective surfaces are configured to fold the optical axis.

20 Claims, 12 Drawing Sheets

(56) References Cited

U.S. PATENT DOCUMENTS

| | | | |
|---|---|---|---|
| 7,445,154 B2 | 11/2008 | Vinogradov et al. | |
| 8,488,216 B2 | 7/2013 | Sakamoto et al. | |
| 9,996,721 B2 | 6/2018 | Oteo et al. | |
| 2004/0094626 A1 | 5/2004 | Sillman et al. | |
| 2007/0007353 A1* | 1/2007 | Danielson | G06K 7/10881 235/462.46 |
| 2007/0108284 A1* | 5/2007 | Pankow | G06K 7/10851 235/454 |
| 2010/0219249 A1 | 9/2010 | Barkan et al. | |

* cited by examiner

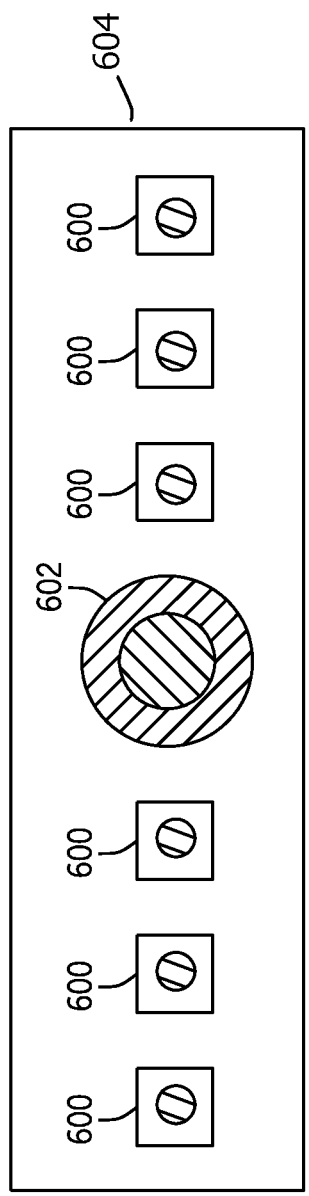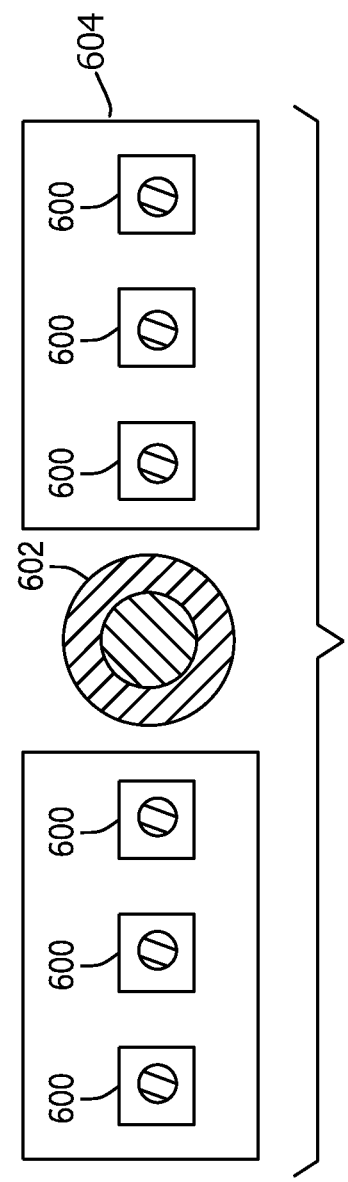

OPTICAL IMAGING DEVICES AND METHODS

CROSS REFERENCE TO RELATED APPLICATIONS

This application is a continuation, under 35 U.S.C. § 120, of U.S. application Ser. No. 15/246,682, filed Aug. 25, 2016, which is hereby incorporated herein by reference in its entirety for all purposes.

STATEMENT OF FEDERALLY SPONSORED RESEARCH OR DEVELOPMENT

Not applicable.

BACKGROUND

Marking of objects with codes for identification is commonly used in both industrial and commercial environments. For example, one-dimensional (barcode) and two-dimensional codes have been placed on objects to allow for quick identification of the object based on the data contained in the codes. Generally, laser based scanning devices and systems are used to read the codes due to their ability to successfully scan the code on an object when the object is moved by the scanner quickly. This can allow for laser based scanning devices to have a high scan rate (lines/second), when compared to other scanning devices.

Additionally, laser based systems can be easily commissioned, as a reading area of a laser scanner can be clearly marked by the laser line. This can allow users to quickly determine proper alignments of the laser scanner and peripheral devices. Further, laser scanning devices can have large viewing angles, (e.g. 60-90 degrees). The large viewing angle allows for laser scanners to be mounted very close to the object to be scanned, or the scanning area (i.e. a conveyor belt) while still maintaining sufficient reading area to be able to read a code.

However, laser based devices are subject to multiple regulations, and are generally regulated to limit the amount of energy that the laser can output. This regulation of the laser output power can limit the distances and fields of view ("FOV") over which the laser based scanning devices and systems can be used. Additionally, many laser based scanning devices utilize rotating or vibrating mirrors to generate a moving spot. These moving parts can subject laser based scanning systems to additional wear and tear, and thereby decrease both reliability and lifespan of the device.

Previously, vision or camera based systems have been used in an attempt to provide an alternate to using laser scanning devices. However, previous vision or camera based systems did not have sufficient scan rates to be able to scan many codes, particularly in applications where the codes are required to be scanned quickly. For example, in an application where the object is moving at approximately 1 m/s, a laser scanner can scan the code at 1000 lines per second. Thus, the code would move only 1 mm between scans. However, a typical vision or camera based system may have a scanning rate of only 30 frames per second, allowing for approximately 33 mm of movement between frames. This can result in missed codes or partially imaged codes, or possibly no capture at all of the code in any of the frames.

Further, in camera or vision based scanning systems, the opening angle of the field of view is determined by the focal length of the imaging lens and the sensor size. Generally, these systems have an opening angle of about 30 degrees to about 40 degrees. These opening angles are generally smaller than for laser based scanning systems. Therefore, for a camera or vision based scanning system to cover the same field of view as a laser based scanning system, the camera or vision based scanning system must be placed farther from the object to be imaged than a laser based scanning system. Thus, a solution for increasing a scanning rate of a vision system is needed.

SUMMARY OF THE INVENTION

An optical imaging device for reading optical codes is disclosed. The image device comprises an area sensor, a lens, a plurality of illumination devices, and a plurality of reflective surfaces. The sensor is configured to sense with a predetermined number of lines of pixels, where the predetermined lines of pixels are arranged in a predetermined position. The lens has an imaging path along an optical axis. The plurality of illumination devices are configured to transmit an illumination pattern by producing an illumination path along the optical axis, and the plurality of reflective surfaces are configured to fold the optical axis.

In some embodiments, only the predetermined lines of pixels are used to image an object. The sensor may have 960 lines of 1280 pixels, and the predetermined used number of lines of pixels may be 40.

In some embodiments, the plurality of illumination devices are light emitting diodes. These illumination devices may be configured on a plane that also contains the optical axis. The plurality of reflective surfaces can be mirrors. Some embodiments comprise reflective surfaces that are configured to fold an illumination axis along the same axis as the optical axis. In some embodiments, folding the optical axis reduces a minimum focused distance to a closest reading plane. Additionally, folding the optical axis may reduce a required mounting space between the device and a closest reading plane. Optionally, an illumination pattern produced by the illumination devices is conjugated with the sensor predetermined used number of lines of pixels.

The optical imaging device may further comprise an exit window, wherein the illumination path and the imaging path would exit the optical imaging device through the exit window. The exit window may additionally include a filter in at least one of the imaging path and illumination path to filter a determined band of the light wavelength spectra. In some embodiments, the exit window comprises multiple filters and the filters in the imaging path and in the illumination path are polarized with crossed directions of polarization.

A method for reading optical codes using an optical device is also disclosed. The method comprises focusing an imaging path along an optical axis using a lens, generating an illumination pattern, folding the imaging path using a plurality of reflective surfaces, and sensing an object in the imaging path using an area sensor. The lens is integrated into the optical device, and the illumination pattern has an illumination path along an axis approximately the same as an axis of the imaging path. The sensor uses only a predetermined number of lines of pixels available to the sensor.

The method may optionally further comprise folding the illumination pattern using the plurality of reflective surfaces. The method may also further comprise reducing reflections from the optical codes using a filter, which may be an ultraviolet filter. The optical device may further include an optical filter in at least one of the imaging path and the illumination path for filtering out a determined band of the light wavelength spectra. The illumination pattern may be generated using a plurality of illumination devices, and the plurality of illumination devices may be integrated into the optical device.

A folding attachment device for an existing optical imaging device is also disclosed. The folding attachment device comprises a folded optical path portion and a line-shaped illumination pattern generator. The folded optical path portion is configured to fold an optical path of the optical imaging device, and the line-shaped illumination pattern generator correlates to a windowed portion of a sensor of the optical imaging device. The line-shaped illumination pattern generator may optionally include at least one of a beam splitter and a dichroic mirror. The device may further comprise a tilted exit window to reduce reflections into the accessory device, and may be tilted at approximately 15 to 30 degrees.

BRIEF DESCRIPTION OF THE DRAWINGS

FIG. 6A is a system view of an embodiment of an illumination device pattern layout for an illumination path on the same plane as the optical axis.

FIG. 6B is an alternative system view of an embodiment of an illumination device pattern layout for an illumination on the same plane as the optical axis.

DETAILED DESCRIPTION OF THE PREFERRED EMBODIMENT

Figure 1:
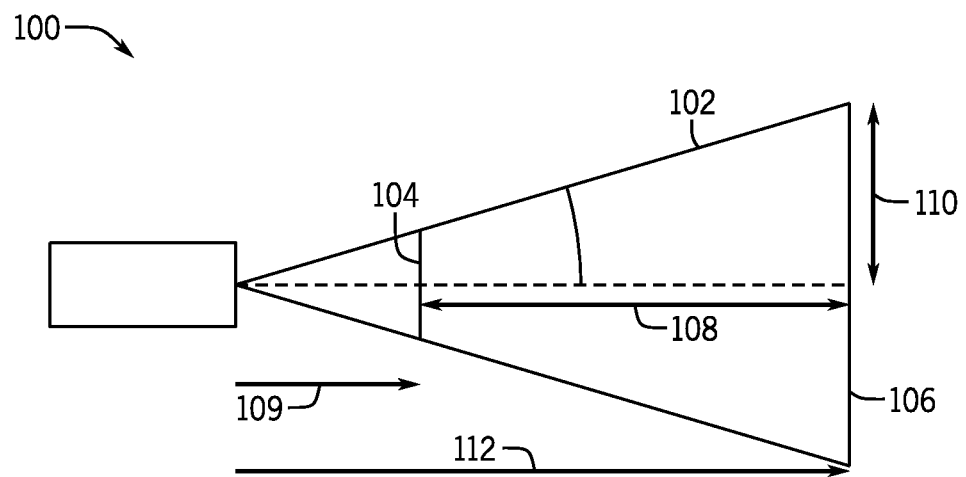
FIG. 1 illustrates a general optical reader field of view determination.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Additionally, the use of the term "code" can be understood to mean various readable codes such as one dimensional "bar codes," two-dimensional codes (e.g. QD codes, etc.), and other various code types. The use of the term code is not limiting to the type of code applied.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

The use of imaging devices and systems to read codes, or even to perform basic imaging tasks, requires that the imaging device, or reader have a minimum distance from the object to be imaged to ensure proper field of view and focus can be achieved. In some applications, the available distance between a reader and the object to be imaged can, at times, be very limited. In some examples, the focal length of a lens used in an optical reader can be modified to reduce a minimum closest focused plane distance. However, reduction of the minimum closest focused plane distance by reducing a focal length can increase the field of view angle, causing a farthest imaging plane to increase in size. This increase in the size of a farthest imaging plane can reduce the resolution in the farthest imaging plane, thereby making it more difficult to analyze smaller objects. An example of adjusting a focal length to reduce the minimum focal distance can be seen in the discussion of FIGS. 1 and 2, below.

FIG. 1 illustrates a general optical reader 100 having a field of view ("FOV") 102. The reader 100 can be configured to read data between a first plane 104 and a second plane 106. The first plane 104 and the second plane 106 can be separated by a first distance 108. In one example, the distance can be 304 mm. However, the first distance 108 can be more than 304 mm or less than 304 mm. Additionally the first plane 104 and the second plane 106 can have defined widths. In one example, the first plane 104 can have a width of 100 mm, and the second plane 106 can have a width of 254 mm. The FOV 102 of the reader 100 can therefore be defined once the size of the sensor and the focal length of a lens within the reader are determined. In the example of FIG. 1, assuming a one-third inch sensor, and a 9.6 mm focal length lens, the FOV 102 can be ±14 degrees, where the first plane 104 and the second plane 106 are arranged as discussed above. This results in a distance 109 between the first plane 104 and the reader 100 being approximately 203 mm. The distance 109 being 203 mm can be inappropriate for some applications, particularly where space is limited. The FOV 102 can generally be determined by the equation $$\tan\alpha = \frac{s}{f'},$$

where α is equal to the FOV angle 102, f' is equal to the focal length of a lens, and s is equal to and imaging sensor size. Alternatively, the FOV can be determine by the equation of $$\tan\alpha = \frac{y}{d},$$

where y is equal to half the length of the second plane 106, (shown as distance 110), and d is equal to the distance from the reader 100 to the farthest plane 106 (shown as distance 112).

Figure 2:
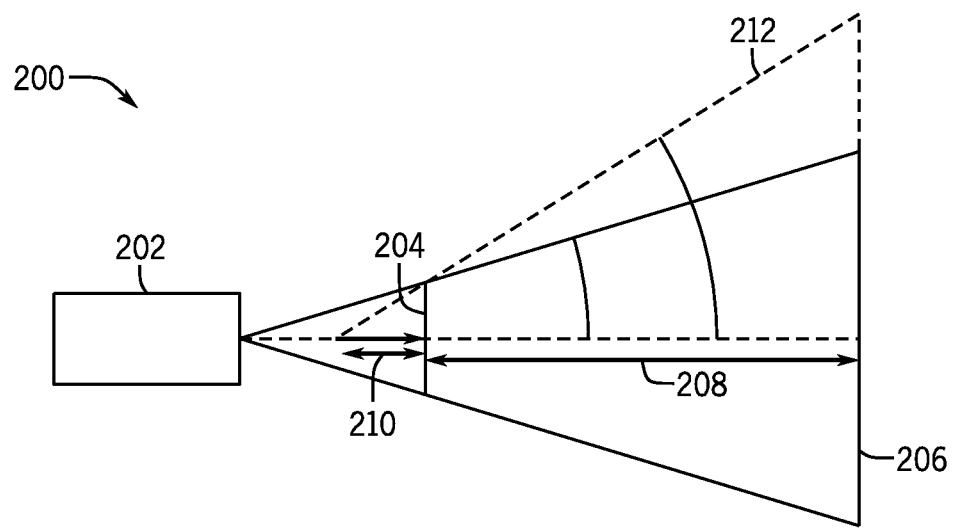
FIG. 2 illustrates an optical reader field of view determination having an alternate lens focal length.

To reduce the minimum focal distance to the first plane 104, the focal length of the lens of the reader 100 can be decreased. Turning now to FIG. 2, an example imaging system 200 can be seen with a reader 202 having a lens with a focal length of 4.2 mm. The system 200 can further have a first plane 204 and a second plane 206 separated by a distance 208. For purposes of comparison, in this example the first plane 204 and the second plane 206 are separated by approximately 304 mm. By reducing the focal length of the lens to 4.2 mm, from the 9.6 mm focal length used in the system in FIG. 1, the minimum distance 210 to the first plane 204 can be reduced to 88 mm, assuming the same one-third inch sensor is used. Further, this changes the angle of a FOV 212 of the imaging path to approximately 30 degrees. Furthermore, the width of the second plane 206, assuming the first plane 204 has a width of 100 mm, increases to 455 mm.

While the above examples provide a possible solution for reducing a minimum distance to the object to be imaged by the imaging system by reducing the focal length of the lens, in some examples it may not be possible to reduce the minimum distance to the object to be imaged enough for a given application. One solution to further reduce the space required between an imaging device and an object to be imaged is to fold the optical path. In one example, mirrors can be used to fold the optical path. However, other reflective surfaces can be used to fold the optical path, such as prisms where internal reflection is produced.

Figure 3A:
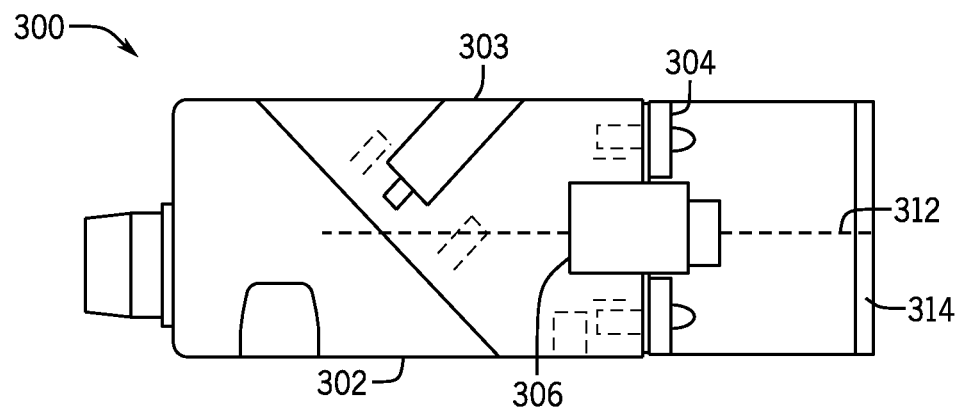
FIG. 3A is a system view of a general optical reader.
Figure 3B:
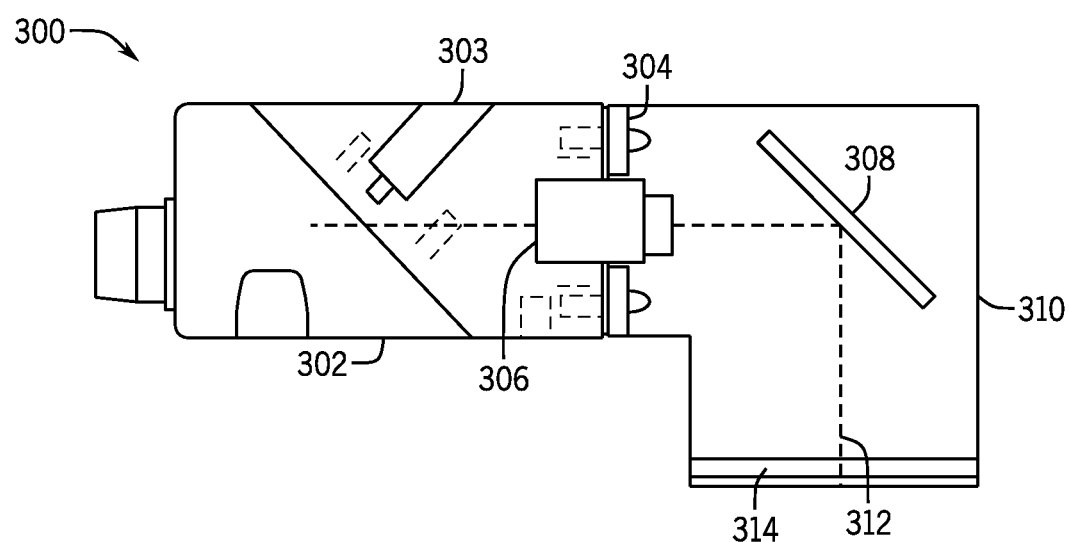
FIG. 3B is a system view of a general optical reader having a single fold.
Figure 4:
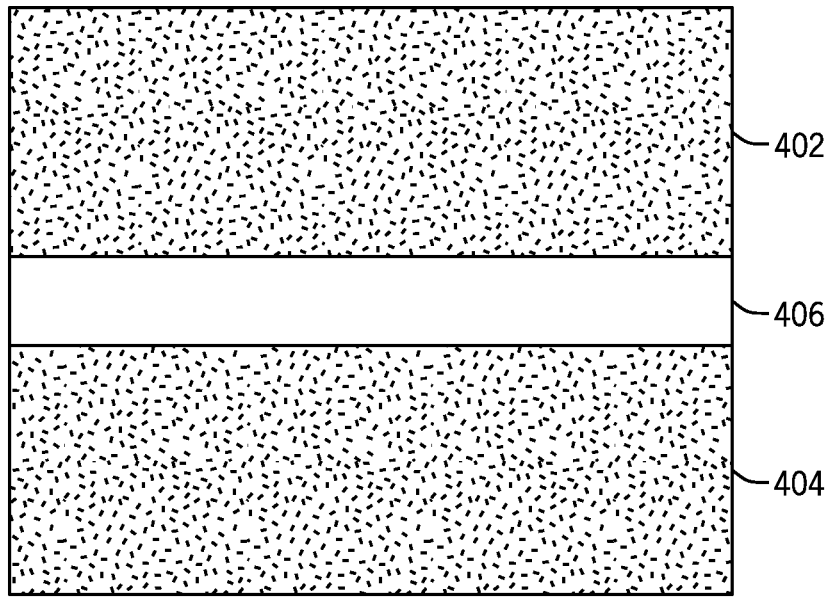
FIG. 4 is a graphical representation of a windowed sensor.

Turning now to FIGS. 3A and 3B, an optical imaging system 300 can be seen. The optical imaging system 300 can have an imaging device 302. The imaging device 302 can include a sensor 303, one or more illumination devices 304 and an imaging lens 306. The optical imaging system can further include a reflective surface 308, which can be contained in an enclosure 310, as shown in FIG. 3B. In one embodiment the sensor 303 can be a CMOS-type sensor. Alternatively, the sensor 303 can be a CCD type sensor, or other type of applicable sensor. In one embodiment, the sensor 303 can be an AR0134 sensor from Aptina. Imaging sensors can generally limit the scan speed of an object due to the limited frame rate available in many digital imaging sensors. To increase the frame rate of a digital imaging sensor, the effective sensing area of the sensor 303 can be reduced. For example, as shown in FIG. 4, a graphical representation of a sensing area 400 of a sensor can be seen. The sensing area 400 can contain multiple pixels. The number of pixels in a given sensing area 400 determines the resolution of a given sensor. In some embodiments, sensors can have millions of pixels (megapixels). For example, common sensor sizes can be 4 megapixels, 8 megapixels, 12 megapixels, etc. The higher the number of pixels in the sensing area 400, the greater the resolution of the sensor. While greater pixel counts increase the resolution of a sensor, the increase in resolution can have an adverse effect on scanning speed due to the required processing power associated with the increased number of pixels.

To increase a scanning speed of a sensor without reducing the desired resolution, the sensing area 400 can be reduced such that only a portion of the sensing face 400 remains active. FIG. 4 shows a first inactive area 402 and a second inactive area 404 surrounding an active pixel area 406. In one embodiment, the active pixel area 406 can be sized to the expected FOV required to view a particular code. For example, where a one dimensional bar code is expected to be scanned in a particular orientation (i.e. vertical or horizontal), the active pixel area 406 can be oriented similarly (vertically or horizontally). Further, as only a portion of the width of the given code is required for a one dimensional code, the active area 406 can be reduced to a few lines of pixels. For example, the active sensing area 406 can be reduced to between 10 lines and 50 lines. However, more or fewer lines of pixels can also be used, as necessary for a given application. In one example, for a sensor having a resolution of 960 lines 1280 pixels, and a frame rate of 54 frames per second, by using only 40 lines of 1280 pixels, the active sensing area 406 can be reduced by a factor of 24 and the frame rate can be increased by a corresponding factor of 24. This increase in frame rate can allow for increased scanning speed and throughput when using an optical imaging system. Additionally, the active sensing area 406 can be reduced to a number of lines between 10 and 100. While the active sensing area 406 could be reduced to less than 10 lines, maintaining at least 10 lines can reduce the effect of dead pixels in the sensor. Further, maintaining at least 10 lines in the active sensing area 406 can improve accuracy of an imaging device by providing increased information in comparison to a line sensor.

Figure 5:
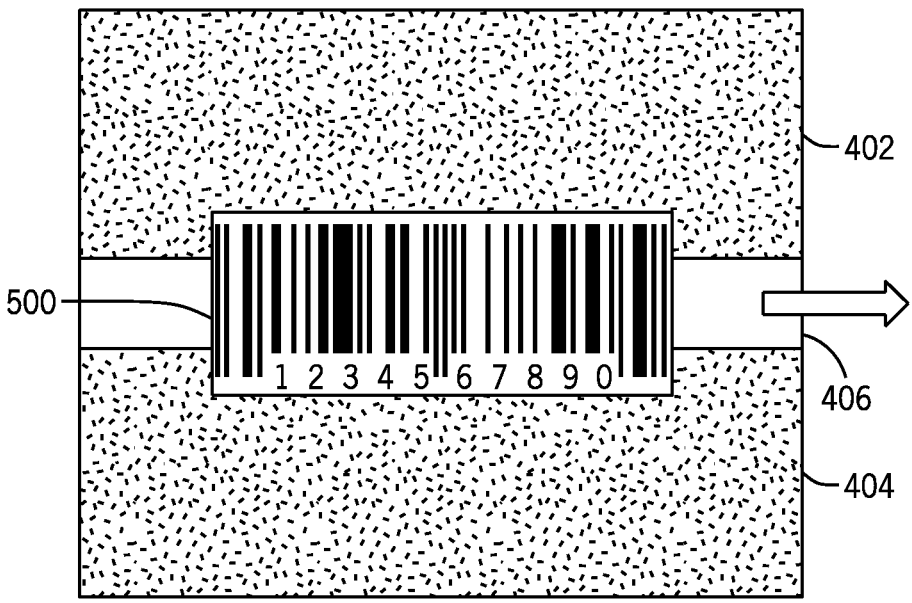
FIG. 5 is a graphical representation of a windowed sensor sensing a one dimensional bar code moving in a defined direction.

Turning now to FIG. 5, the sensing face 400 of FIG. 4 is shown imaging a one dimensional bar code 500 as it passes through the sensing face 400 in the direction shown. The orientation of the imaged code is such that the active sensing area 406 is able to image all of the data in the bar code 500, even though only a portion of the sensing face 400 is active. In one embodiment, the active sensing area 406 can be oriented horizontally (to coincide with the largest dimension of the sensor) to allow for a larger FOV and a better resolution, and can also be aligned with the movement direction of the code.

Returning now to FIG. 3A and 3B, the optical reader 300 can include one or more illumination devices 304. In one embodiment, the illumination devices 304 can be light emitting diodes ("LED"). In some examples, the illuminations devices 304 can be a single color LED. Alternatively, multiple colored LEDs can be used to allow for different wavelengths to be presented to the object depending on the type of code to be imaged. In some embodiments, the illumination devices 304 can output light at a constant output. Alternatively, the optical reader 300 can vary the output of the illumination devices 304. For example, in some applications, the code to be read may be on a highly reflective object, where high intensity light can obscure or "wash-out" the code. Thus, the output of the illumination devices 304 can be reduced to ensure proper illumination of the object. Additionally, the illumination devices may comprise illumination optics, which are discussed in more detail with reference to FIGS. 16A-16C.

Furthermore, filters located in an exit window 314 of the imaging device 300 can be used to filter out ambient light, as shown in FIGS. 3A and 3B. Additionally, filters may be designed to filter out a determined band of the light wavelength spectra, and can filter the imaging path, illumination path, or both. In one example, the illumination devices 304 can output light in the ultraviolet spectrum. Further, in some examples, the codes on the objects can be printed using a fluorescent ink, wherein the emission wavelength is different from the excitation wavelength, the use of a filter on the imaging path can allow only the fluorescence emission wavelength provided by the fluorescent ink to pass through; thereby allowing only the object of interest (the code) to be imaged.

Additionally, cross-polarized light can be used to avoid reflections on the objects to be imaged. This feature is advantageous where the code to be imaged is on a shiny or reflective surface, such as a polished metal object. To polarize the light, a polarizer can be placed in front of the illumination devices 304, and a polarizer with the polarizing direction perpendicular to the illumination polarizer can be placed in the imaging path. In one embodiment, the polarizer can be integrated into the exit window 314. Alternatively, the polarizer can be incorporated into the illumination devices 304 and into the imaging lens. Further, the polarizer can be placed directly in front of the illumination devices 304 and in front of the imaging lens. In some embodiments the polarization direction of the imaging path can be parallel to the illumination polarizer; alternatively, the polarization direction can be perpendicular to the illumination polarizer. Generally, the orientation of the polarizer is selected based on the application.

The one or more illumination devices 304 can further be oriented such that the light is transmitted along approximately the same axis as an optical imaging axis 312. In some embodiments, the illumination devices 304 are configured on a plane that contains the optical imaging axis 312. In one embodiment, the illumination devices 304 can transmit light along a similar but separate axis from that of the optical imaging axis 312. However, as both the optical imaging axis 312 and the illumination axis are approximately the same due to the use of the reflective surface 308, both axis can be close enough such that the illumination devices 304 provide illumination in the field of view of the optical reader 300.

In one embodiment, one or more illumination devices 304 can be used. Further, to help match an illumination pattern geometry to an imaging path or to coincide with a sensing area, such as active sensing area 406 discussed above. One example of positioning the illumination devices can be seen in FIG. 6A. FIG. 6A illustrates a plurality of illumination devices 600 and an imaging lens 602 positioned in an illumination optic 604. As shown in FIG. 6A the illumination devices 600 can be arranged linearly. Further, the illumination devices 600 can be equally distributed on either side of the imaging lens 602. Alternatively, the illumination devices 600 can be distributed unevenly, or in a non-linear pattern, as applicable. The illumination device 600, as arranged in FIG. 6A, can project an illumination pattern similar to the active sensing area 406 of FIGS. 4 and 5.

The illumination optic 604 can be produced in a number of ways. In some embodiments, the illumination devices 600 are placed within an injection molded part, e.g., the illumination optic 604, and can take on any desired shape, such as those shown in FIGS. 16A-16C for non-limiting examples of the illumination optics. In some embodiments, an aperture can be included for the imaging path. In some embodiments, the illumination optics are formed in a single injection molded part, like that shown in FIG. 6A. In other embodiments, illumination optics may be grouped together, such that a plurality, but not all of the illumination optics are positioned in a group of injection molded parts, as shown in FIG. 6B. In yet other embodiments, the illumination optics are positioned individually. It has been further contemplated that other polymer forming processes can be used, such as thermoforming, compression molding, blow molding, and others known in the art.

In some embodiments it is desirable to have the illumination devices 304 provide illumination along the same axis as the optical imaging axis. For example, when the imaging device is in close proximity to the object to be imaged, it can be advantageous to provide illumination in line with the optical imaging axis. For example, it can be advantageous to provide illumination along the same axis as an optical imaging axis when imaging objects over long distances, as where there is an angle between the imaging path and the illumination path, the illumination, after a certain distance, can be partially or totally outside the FOV. By having the illumination path in line with the optical imaging axis, the illumination will generally illuminate the FOV. This can further allow for increased efficiency when imaging objects over longer distances.

Additionally, by providing the illumination in line with the optical imaging axis, commissioning and set up of the optical imaging system 300 can be aided by allowing a user to use the illumination as a guide to understand exactly where the imaging path is. Thus, by providing illumination in line with the optical axis, an advantage of a laser based scanning system can be incorporated into an optical imaging system. In some embodiments, a beam splitter (for example, a 50% transmission, 50% reflection beam splitter) can be used to converge the illumination axis with the optical imaging axis. However, other optical manipulation devices can also be used. For example, a dichroic filter can be used in lieu of a beam splitter when different wavelengths are used for the illumination and imaging paths, such as when fluorescent imaging is used.

The reflective surface 308 of the optical reader 300 can be used to "fold" the imaging path, as shown in FIG. 3B. In one embodiment, the reflective surface can be a mirror. Alternatively, other reflective materials, such as prisms, can be used. The reflective surface 308 can allow for the optical reader 300 to be placed near the closest desired reading plane. For example, the imaging lens 306 of the optical reader 300 can have a 4.2 mm focal length, such that to maintain the desired FOV described above would make the minimum focused distance 88 mm. This would generally require a closest reading plane to be at least 88 mm away from the imaging lens 306. In some applications, the distance to the first focused plane needs to be smaller, for example, 30 mm. However, by positioning the reflective surface 308 at a 45 degree angle, the optical imaging axis 312 can be folded at a 90 degree angle. This can allow the optical reader 300 to be positioned closer to the closest reading plane. In the present example, assuming that the reflective surface 308 is positioned approximately 30 mm from the focal lens 306 and 30 mm from the exit window 314 of the enclosure 310, 60 mm of the 88 mm minimum focus distance can be located within the optical imaging system 300, thereby requiring only a distance of 28 mm between the exit window 314 of the optical imaging system 300 and the closest reading plane.

Figure 7:
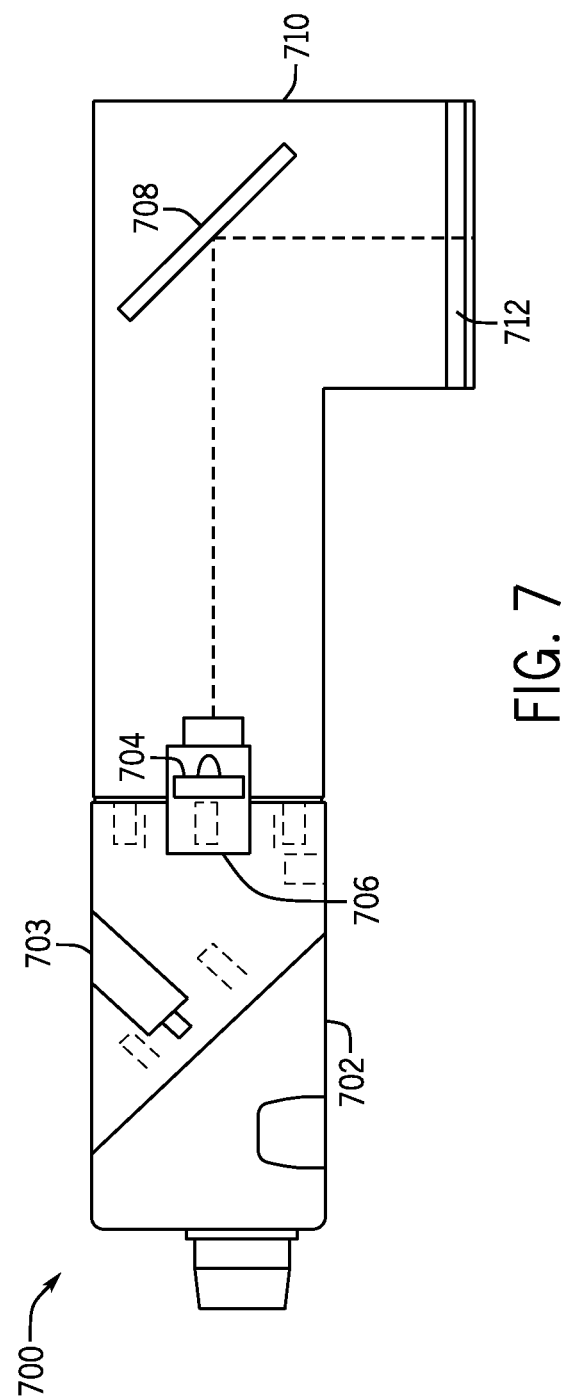
FIG. 7 is a system view of an alternate one fold optical reader with longer inner path.

Turning now to FIG. 7, an alternative embodiment of the optical imaging system 300 of FIG. 3 can be seen. FIG. 7 illustrates an optical imaging system 700, the optical imaging system 700 can include an imaging device 702. The imaging device 702 can include a sensor 702, one or more illumination devices 704, and an imaging lens 706. In similar embodiments, the one or more illumination devices 704 can be located in the same horizontal plane as the imaging lens 706. In embodiments such as this, a plurality of illumination devices 704 may be located on either side of the imaging lens 706, such as in the orientation of illumination devices 600 and imaging lens 602 shown in FIG. 6A, 6B, or those other orientations discussed above. The optical imaging system can further include a reflective surface 708 which can be contained in an enclosure 710. However, in this embodiment, the reflective surface 708 can be positioned approximately 65 mm from the focal lens 706 and 25 mm from an exit window 712 of the enclosure 710. This can allow for zero distance between the exit window 712 of the optical reader 700 and a closest reading plane, where the imaging lens 706 has a 4.2 mm focal length. Thus, FIG. 7 illustrates a possible modification to the imaging path within the optical imaging system 700 to allow for the minimal focused distance to be contained completely within the optical imaging system 700. This can allow for additional flexibility when integrating the optical imaging system 700 into an application.

Figure 8:
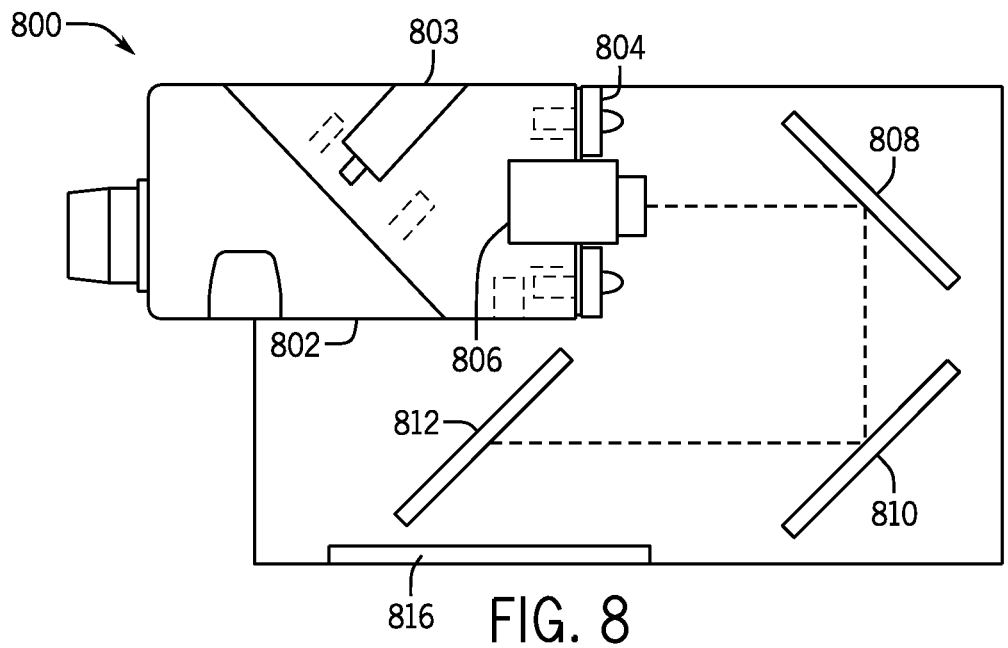
FIG. 8 is a system view of an exemplary imaging system with a multiple folded optical path.

Turning now to FIG. 8, a further embodiment of an optical imaging system can be seen. FIG. 8 illustrates an optical imaging system 800. The optical imaging system 800 can include an imaging device 802. The imaging device 802 can include a sensor 803, one or more illumination devices 804, and an imaging lens 806. The optical imaging system 800 can further include a first reflective surface 808, a second reflective surface 810 and a third reflective surface 812. The reflective surfaces 808, 810, 812 can be contained within an enclosure 814. In this embodiment, the imaging and illumination paths can be folded by the reflective surfaces 808, 810, 812 to allow for an alternative enclosure 814 design. Similar to above, the reflective surfaces 808, 810, 812 can be positioned to allow for the entire minimum focused plane distance to be contained within the enclosure 814, such that no additional distance is required between the exit window 816 and the closest reading plane. However, the reflective surfaces 808, 810, 812 could also be positioned to minimize the enclosure 814 size, while also limiting the additional distance required between the exit window 816 and the closest reading plane, as applicable. While the optical imaging system 800 is shown with three reflective surfaces, more than three reflective surfaces or less than three reflective surfaces can be used, as applicable.

Figure 9:
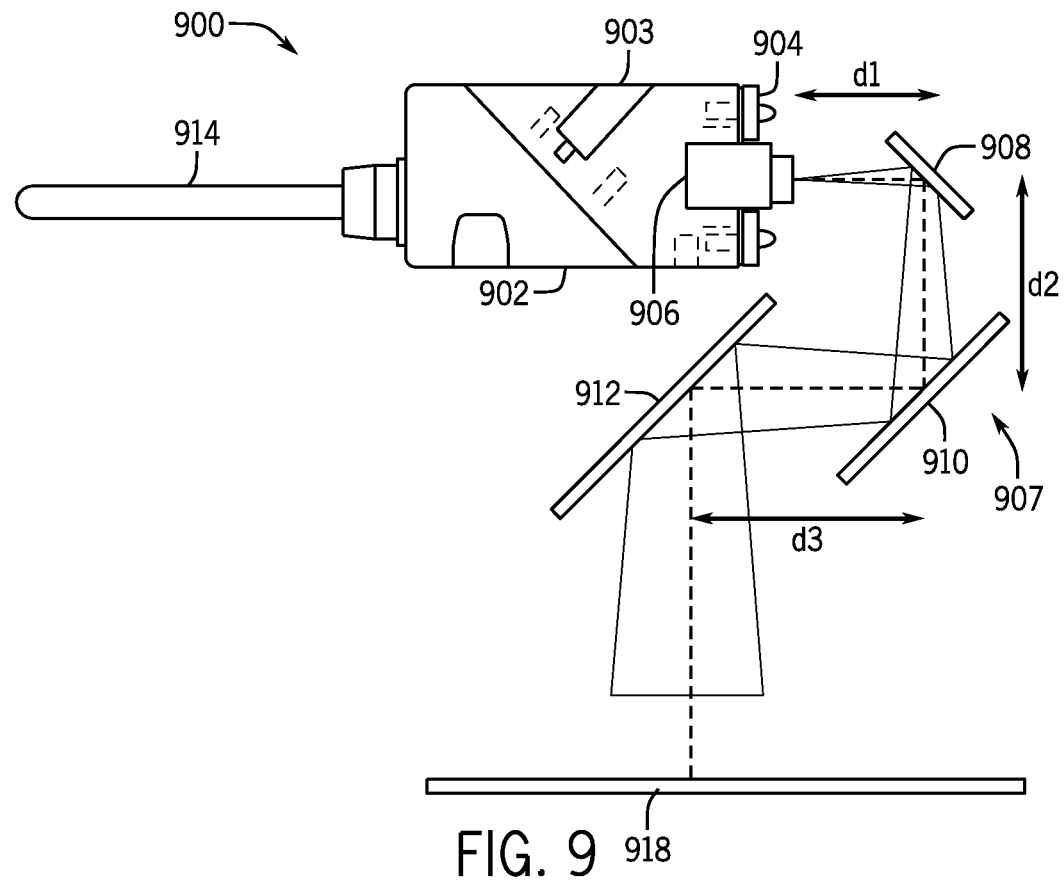
FIG. 9 is a system view of an embodiment of a multiple reflective surface imaging system illustrating the folding of an optical path in the imaging system.

In some examples, the multiple reflective surface optical reader 800 can be used in applications where the focal length of the imaging lens 806 requires a greater minimum focal length. For example, FIG. 9 shows a detailed view of a multiple reflective surface optical imaging system 900. The optical imaging system 900 can include an imaging device 902, the imaging device 902 including a sensor 903, one or more illumination devices 904, and an imaging lens 906. The imaging system 900 can further include an optical folding device 907, the optical folding device 907 can include a first reflective surface 908, a second reflective surface 910 and a third reflective surface 912. In one embodiment, the imaging device can be a DM150 or DM260 from Cognex. Further, a communication connection 914 can be seen coupled to the imaging device 902. In one embodiment, the communication connection 914 can provide communication between the imaging device 902 and a processing device (not shown) such as a PC, or dedicated image processing system. In one embodiment, the communication connection 914 can communicate via a serial connection, such as RS-262, RS-485, Universal Serial Bus ("USB"), or via other protocols such as Firewire, Ethernet, ModBus, DeviceNet, or other applicable communication protocol. In a further embodiment, the communication link 914 can be a wireless communication link. For example, the communication link 914 can provide communication with other devices, such as the processing device discussed above, using wireless protocols such as Wi-Fi, Zigbee, Bluetooth, RF, cellular (3G, 4G, LTE, CDMA), or other known or future developed wired or wireless communication protocols. Additionally, the communication connection 914 can be used to provide power to the imaging device 902. Alternatively, the imaging device 902 may have an alternate power source, such as battery power, or a separate external power supply connection.

In this example, the imaging lens 906 can have a focal length of 6.2 mm. Thus, assuming that the first imaged plane is approximately four inches wide, the minimum object distance would be 131 mm. However, using the equations described above, a minimum focal length can be determined for any given closer and/or farther plane widths. Further, where the imaging lens 906 lens has a 6.2 mm focal length, the optical reader 900 can be designed to allow for 68 mm of the minimal focused distance to be folded between the reflective surfaces 908, 910, 912. To do so, the distance (d1) between the focal lens 906 and the first reflective surface 908 can be 15 mm; the distance (d2) between the first reflective surface 908 and the second reflective surface 910 can be 25 mm; and, the distance (d3) between the second reflective surface 910 and the third reflective surface 912 can be 28 mm. Thus, a remaining distance of 63 mm is required between the third reflective surface 910 and an object plane 916 to achieve the minimal focused distance.

As the imaging and illumination planes are "folded" between the reflective surfaces 908, 910, 912, the FOV of the imaging plane increases, requiring the reflective surfaces 908, 910, 912 to increase in size after each "fold." Using the values discussed above, reflective surface 908 would require a dimension of about 40 mm about the long axis. Reflective surface 910 would require a dimension of about 60 mm about the long axis, and reflective surface 912 would require a dimension of about 85 mm about the long axis. The size of the individual reflective surfaces can be determined using the equation $$\tan\alpha = \frac{L/2}{d},$$

where $\alpha$ is the FOV angle, L is the length of the mirror, and d is the distance between the mirror and the reader (or, alternatively, between mirrors in a multiple mirror system). Thus, by varying the distances and sizes of multiple reflective surfaces, the imaging path can be "folded" to allow for a more compact installation by reducing the physical distance required between an imaging device and a first imaged plane.

Additionally, while the above optical imaging system 900 described as an entire system, in some embodiments it may be desirable to modify an existing imaging device (e.g. imaging device 902) by incorporating an optical folding device (e.g. optical folding device 907) onto the existing imaging device, to allow for existing devices to be modified accordingly.

Figure 10:
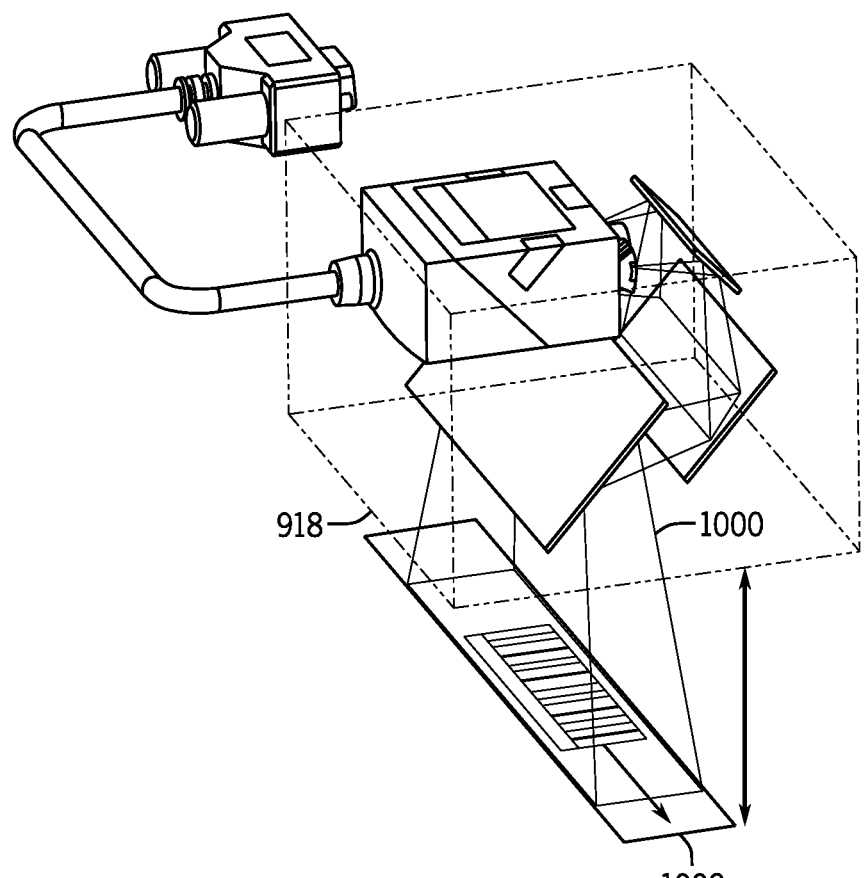
FIG. 10 is an isometric view of the multiple reflective surface imaging system of FIG. 8.
Figure 11:
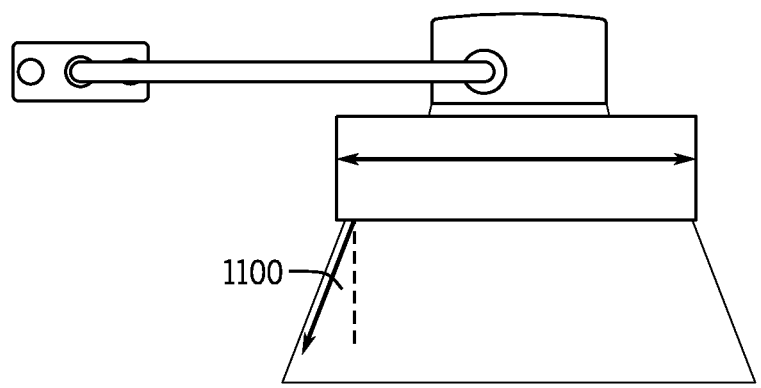
FIG. 11 is a side view of the multiple reflective surface imaging system of FIG. 8.

Turning now to FIG. 10, an isometric view of the optical imaging system 900 described above can be seen. Here, the FOV of the optical imaging path 1000 can be seen. As seen in FIG. 10, the FOV can have a substantially rectangular shape, to coincide with the imaged surface 1002. The shape can be chosen for processing optical codes 1004 that may be passing through the imaged surface 1002 in the direction shown. The rectangular shape can be caused by the windowed sensor, as discussed above. FIG. 10 further illustrates an enclosure 918 surrounding the imaging device 902, and the reflective surfaces 908, 910, 912. FIG. 11 shows a side view of the optical imaging system 900. As seen in FIG. 11, an angle of the FOV of the optical imaging path 1100 can be seen as the image path exits the enclosure 918. In the example discussed above, the output angle can be about 21 degrees.

Figure 12:
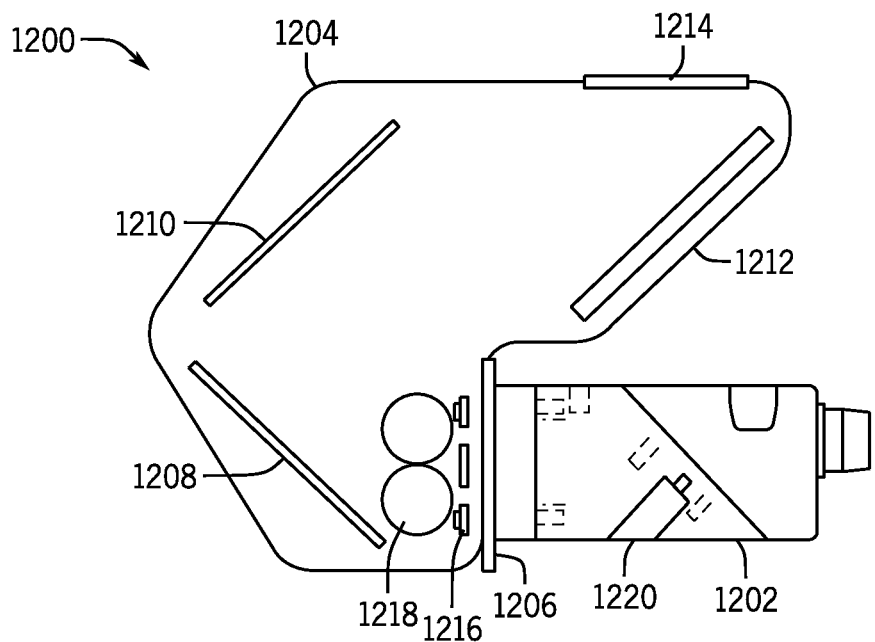
FIG. 12 is a cross sectional view of an alternate multiple reflective surface imaging system.

Turning now to FIG. 12, an alternative embodiment of a multiple reflective imaging system 1200 can be seen. The imaging system 1200 can include an imaging device 1202. The imaging device 1202 can be an imaging device as discussed above. The imaging device 1202 can be attached to a folding device 1204 via an adaptor plate 1206. The folding device 1204 can include a first reflective surface 1208, a second reflective surface 1210, a third reflective surface 1212 and an exit window 1214. The folding device can further include illumination devices 1216. The illumination devices 1216 can be a plurality of LEDs. Further, the folding device 1204 can include an optical lens 1218. The optical lens 1218 can be positioned at the output of the illumination devices 1216. In one embodiment, the optical lens 1218 can create a line pattern using the output from the illumination devices. As discussed above, this can aid in commissioning and setup of the imaging system 1200 by allowing a user to visualize where the optical imaging path is located, and to improve the illumination system efficiency. For example, the optical lens 1218 can be used to shape the illumination to match a conjugate active portion of a sensor 1222 in the imaging device 1202 to match the illumination pattern to the imaging path FOV.

Figure 13:
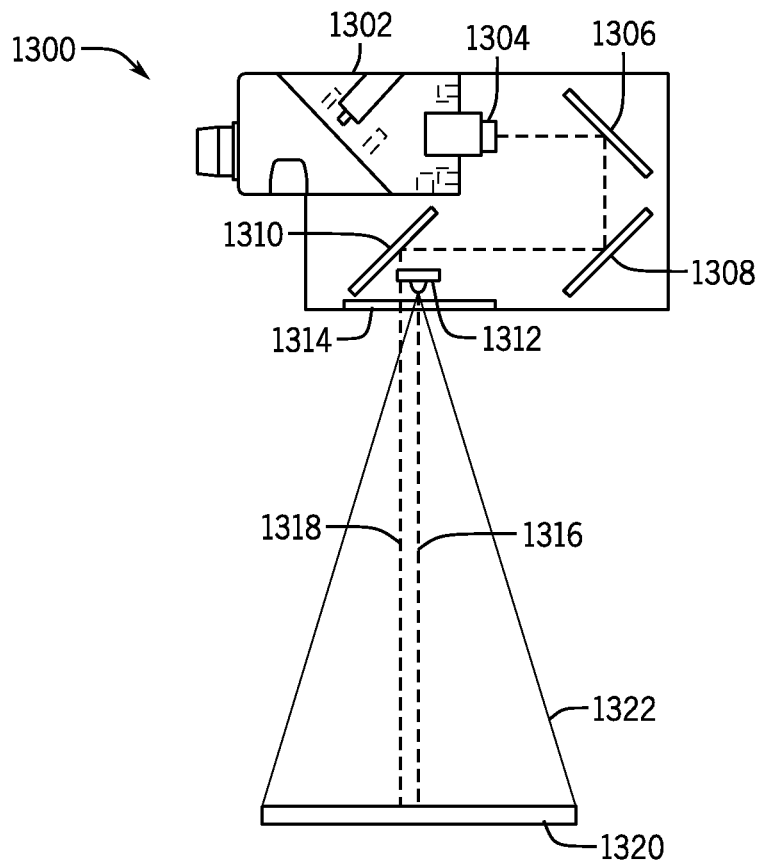
FIG. 13 is an alternate embodiment of a multiple reflective surface imaging system wherein the illumination is not folded with the imaging path.

Turning now to FIG. 13, a further embodiment of an optical reader can be seen as optical reader system 1300. The optical reader system 1300 can include an imaging device 1302 having an imaging lens 1304, a first reflective surface 1306, a second reflective surface 1308, and a third reflective surface 1310. The optical reader system 1300 can further include one or more illumination devices 1312. In the embodiment of FIG. 13, the illumination devices 1312 can be located at the exit of the optical reader system 1300 and adjacent to an exit window 1314. This can allow for an illumination axis 1316 to have generally the same axis as an imaging axis 1318. Further, the illumination devices 1312 can be configured to project light such that the imaging object 1320 is illuminated throughout the imaging FOV 1322.

Figure 14:
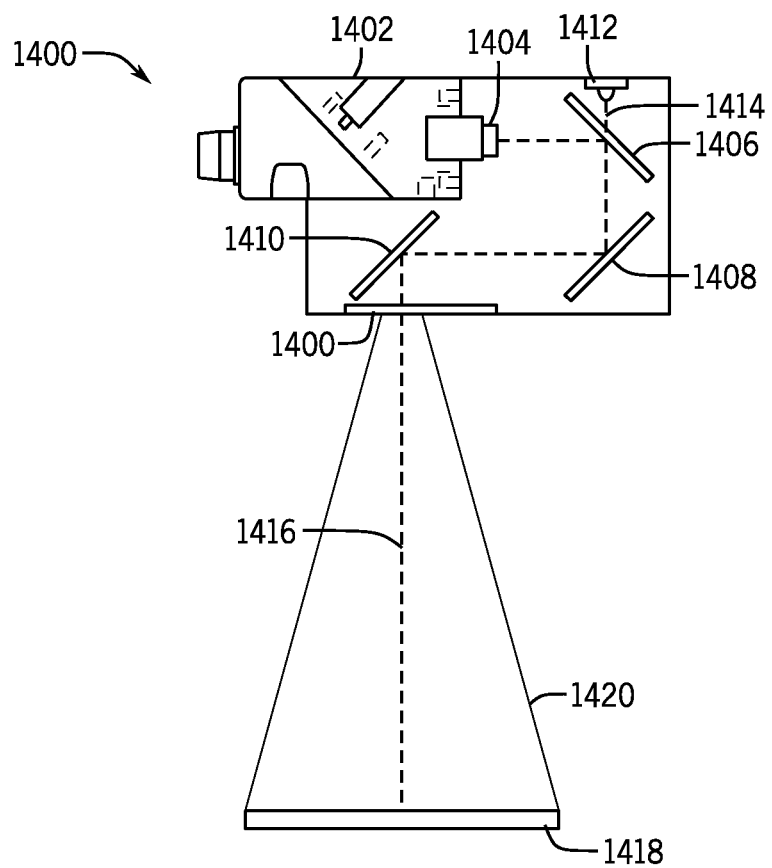
FIG. 14 is an alternative embodiment of a multiple reflective surface imaging system having a beam splitter to combine the illumination path and the optical path.

Turning now to FIG. 14, a further embodiment of an optical reader system can be seen as optical reader system 1400. The optical reader system 1400 can include an optical imaging device 1402 having an imaging lens 1404, a first reflective surface 1406, a second reflective surface 1408, and a third reflective surface 1410. In one example, the optical imaging device 1402 can be an optical imaging device as described above. The optical reader system 1400 can also include one or more illumination devices 1412. In one embodiment, the illumination devices 1412 can be positioned behind the first reflective surface 1406. The reflective surface 1406 can be configured to allow the illumination to pass through the first reflective surface 1406 and to align an illumination axis 1414 with an imaging axis 1416. In one embodiment, the first reflective surface 1406 can be a beam splitter. Alternatively, the first reflective surface 1406 can be a dichroic filter. By aligning the illumination axis 1414 with the imaging axis 1416, an imaging object 1418 can be illuminated on axis through the imaging FOV 1420.

Figure 15:
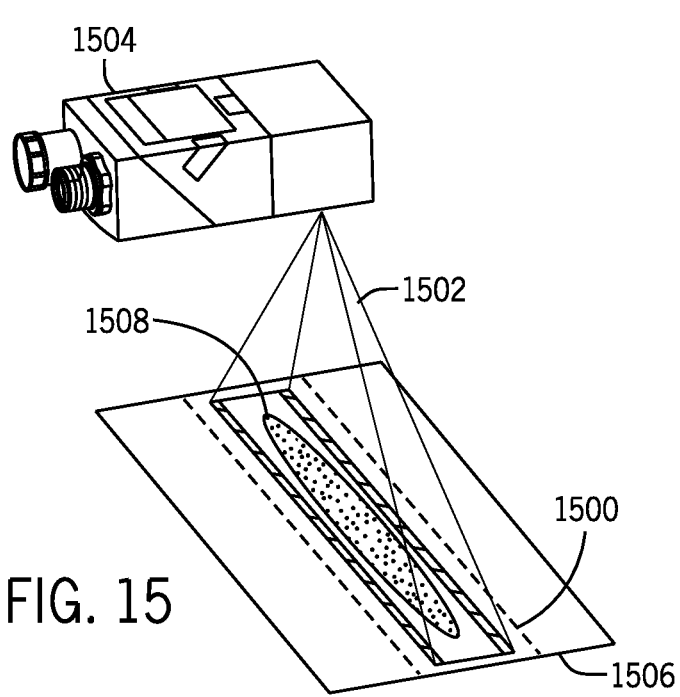
FIG. 15 illustrates a possible illumination pattern using an optical imaging device as illustrated above.

FIG. 15 illustrates an illumination distribution pattern 1508 where an illumination path is transmitted along the same, or similar, axis as an optical imaging path. Here, the imaging FOV 1502 is shown as being projected from an optical imaging system 1504. Similarly, the illumination distribution pattern 1508 within the imaging FOV 1502 is shown projected onto an imaging object 1506. As seen in FIG. 15, the most intense illumination is shown in the darker portions of the illumination distribution pattern 1508, which is elongated in shape to coincide with the imaging FOV 1502. This distribution of illumination shown in illumination distribution pattern 1508 can provide full illumination of the imaging object 1506 to allow for more efficient and accurate imaging. If the sensor in the optical imaging system 1504 is windowed to a predetermined number of lines of pixels, as described above with reference to FIGS. 4 and 5, the illumination field 1500 can be conjugated with that number of lines of pixels, such that the illumination field 1500 does not extend beyond the imaging FOV 1502. Although the imaging FOV 1502 is constrained in FIG. 15, it is important to note that the illumination field 1500 can extend beyond the imaging FOV in multiple directions.

Figure 16A:
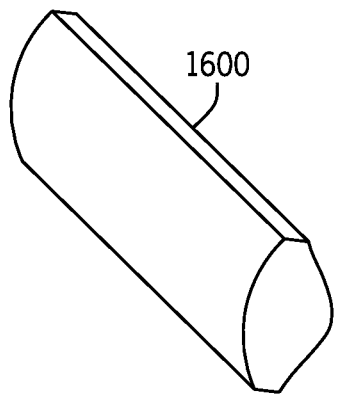
FIGS. 16A-16C illustrate multiple embodiments of illumination optics.
Figure 16B:
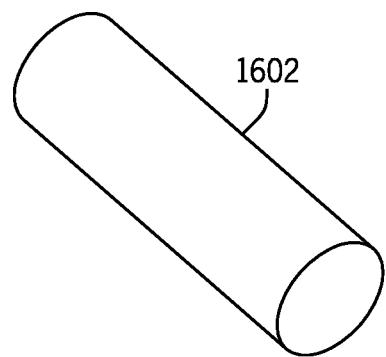
Figure 16C:
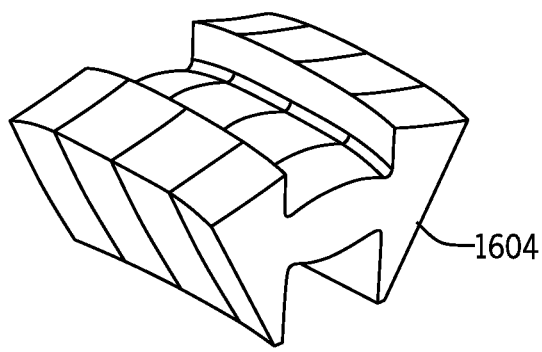

Turning now to FIGS. 16A-16C, a plurality of illumination optics 1600, 1602, and 1604 can be seen. FIG. 16A illustrates an exemplary image of a freeform illumination lens 1600. The freeform illumination lens can be specifically formed to shape and/or pattern illumination from an illumination device. FIG. 16B illustrates an exemplary image of a cylindrical lens 1602 for use with an illumination device. Finally, FIG. 16C illustrates a reflective optic 1604 for use with an illumination device, in this example a total internal reflection (TIR) lens. Each of the illumination optics 1600, 1602, 1604 described above can be used to help shape and or pattern illumination from an illumination device, such as those described above.

Figure 17:
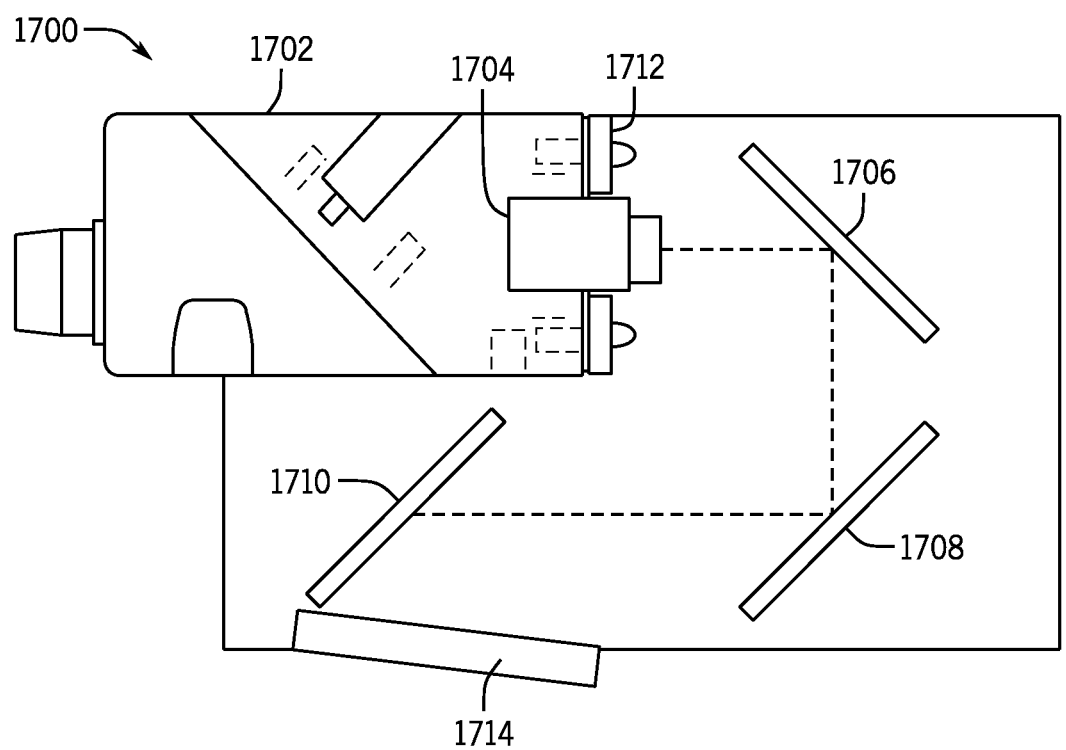
FIG. 17 is an alternative embodiment of a multiple reflective surface imaging system having a tilted exit window.

Turning now to FIG. 17, a further embodiment of an optical reader system can be seen as optical reader system 1700. The optical reader system 1700 can include an optical imaging device 1702 having an imaging lens 1704, a first reflective surface 1706, a second reflective surface 1708, and a third reflective surface 1710. The optical imaging device 1702 can also include one or more illumination devices 1712. The illumination devices 1712 can be configured to align an illumination axis with an imaging axis. The optical reader system 1700 can further include an exit window 1714. In one embodiment, the exit window 1714 can be tilted at an angle to reduce reflections along the imaging axis. In one embodiment, the exit window 1714 can be angled. In some embodiments, the exit window 1714 is angled at approximately 15 degrees. However, the exit window can be angled at more than 15 degrees or less than 15 degrees, as applicable. For instance, the exit window may be angled at approximately 30 degrees. Further, while the exit window 1714 is shown in FIG. 17 as angling from left to right, the direction of the angle can be modified for use in a given application to provide the optimal amount of reflection reduction.

Figure 18:
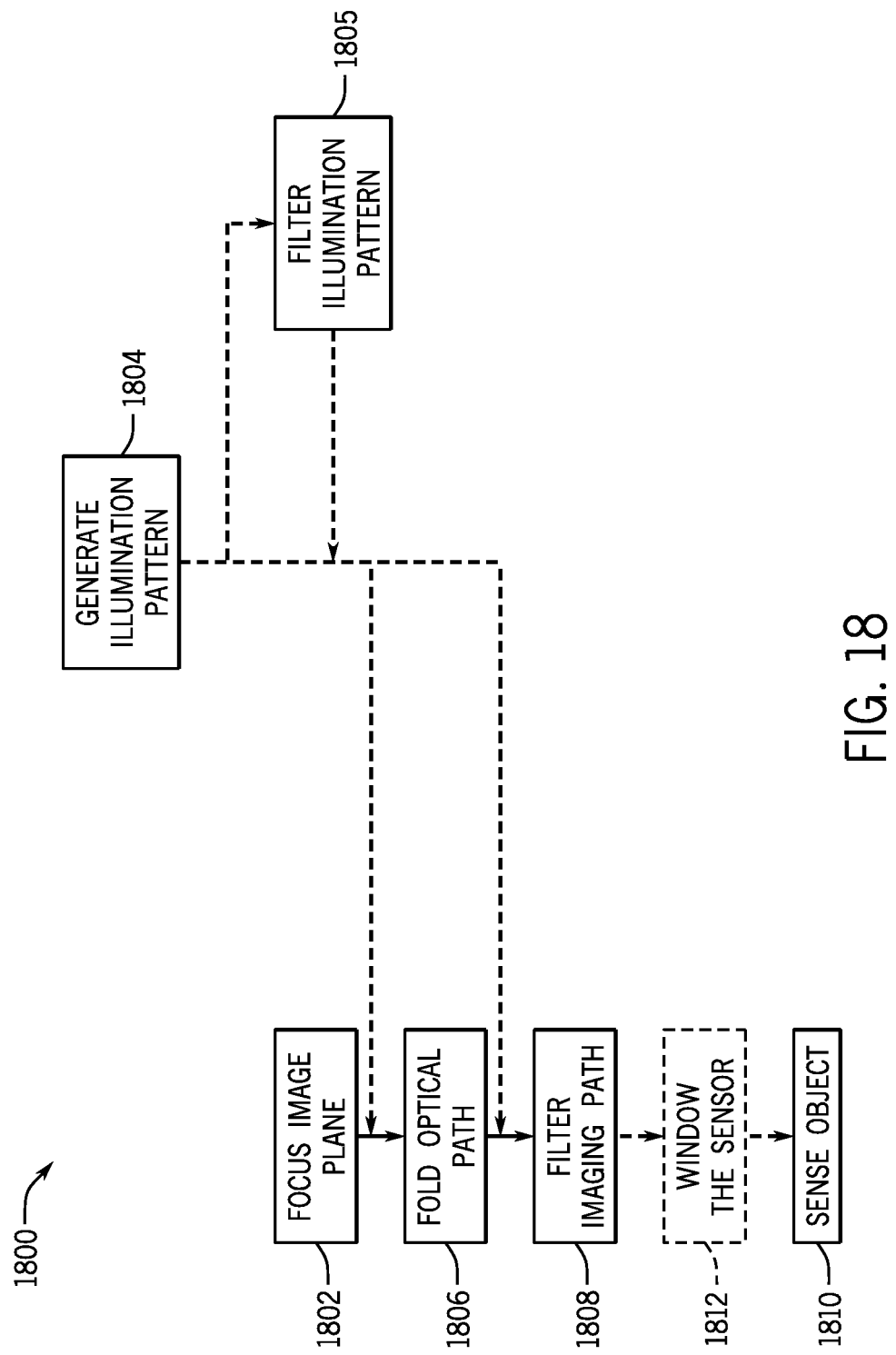
FIG. 18 is a process chart illustrating a process for sensing an object using an optical imaging system.

Turning now to FIG. 18, a process 1800 for sensing an optical code using an optical imaging system as discussed above, can be seen. At process block 1804 an illumination pattern can be generated. In one embodiment, the illumination pattern can be generated using a plurality of illumination devices as discussed above. Further, in some embodiments the illumination pattern can be shaped or filtered as described above, at process block 1805. For example, the illumination pattern may be shaped using beam splitters, dichroic filters, and/or by positioning the illumination devices in a pattern corresponding to a desired illumination pattern, and placed within the illumination path. In one embodiment, the illumination devices can be LEDs. At process block 1802 the imaging path can be focused using a lens of an optical imaging system. In one embodiment, the imaging path can be focused based on the focal length of the lens.

At process block 1806 the imaging path can be folded. In some embodiments, the imaging path can be folded using a plurality of reflective surfaces. For example, mirrors can be used to fold the imaging path, as described above. Folding the imaging path can allow for some or all of the minimum focus distance to be contained within the optical imaging system. Reduction of the focus distance by folding the imaging path is discussed in more detail above. At process block 1808, the imaging path can be filtered. In some optional embodiments, the imaging path is filtered at an exit window of the optical imaging system. For example, the exit window may have an ultraviolet filter, a polarized filter, a dichroic filter, or other filter as applicable. The exit window can also be tilted to provide filtering to reduce reflections from being returned along the imaging path. The exit window can be tilted between 0 and 30 degrees, such as, for example 15 degrees. In some embodiments, the sensor can be windowed 1812 such that only a predetermined portion of the sensor is used to sense objects. As discussed above with reference to FIGS. 4 and 5, windowing can increase the sensing speed and refresh rate of the sensor by reducing the active pixel area. Finally, at process block 1810, an object in the imaging path can be sensed via the sensor of the optical imaging system. Additionally, in some embodiments, the image is registered and processed after the completion of process block 1810.

While the above embodiments describe imaging systems having one or three reflective surfaces arranged as in the figures, these embodiments are not meant to be limiting. It is understood that using the above methods and systems, imaging systems can be designed to be accommodated into various applications and systems.

What is claimed is:

1. An optical imaging device for reading optical codes; the device comprising:
    an area sensor comprising a first plurality of lines of pixels, the area sensor configured to sense with only a second plurality of lines of pixels, the second plurality of lines of pixels arranged in a predetermined position of the area sensor and including fewer lines of pixels than the number of lines of pixels in the first plurality of lines of pixels;
    a lens, the lens having an imaging path along an optical axis; and
    an illumination device, the illumination device configured to transmit an illumination pattern by producing an illumination path along the optical axis.

2. The device of claim 1, wherein the illumination device is configured on a plane that contains the optical axis.

3. The device of claim 1, wherein the illumination pattern is conjugated with the sensor predetermined lines of pixels.

4. The device of claim 1, further comprising a reflective surface, the reflective surface configured to fold the optical path.

5. The device of claim 4, wherein folding the optical axis reduces a required mounting space between the device and a closest reading plane.

6. The device of claim 1, wherein the second plurality of lines of pixels are read out at a second frame rate that is greater than a first frame rate at which the first plurality of lines are configured to be read out at, wherein the second frame rate is greater than the first frame rate in proportion to a ratio of the number of lines of pixels in the first plurality of lines of pixels to the number of lines of pixels in the second plurality of lines of lines of pixels.

7. The device of claim 1, further comprising an exit window, wherein the illumination path and the imaging path exit the optical imaging device through the exit window.

8. The device of claim 7, wherein the exit window includes a filter in at least one of the imaging path and illumination path to filter a determined band of the light wavelength spectra.

9. The device of claim 8, wherein the exit window comprises multiple filters and the filters in the imaging path and in the illumination path are polarized with crossed directions of polarization.

10. The device of claim 1, wherein the first plurality of lines of pixels comprises at least 960 lines of at least 1280 pixels each, and the second plurality of lines comprises no more than 40 lines of pixels of the at least 960 lines.

11. A method for reading optical codes using an optical device; the method comprising:
    generating an illumination pattern, the illumination pattern having an illumination path along an axis approximately the same as an axis of an imaging path;
    focusing the imaging path along an optical axis using a lens, the lens integrated into the optical device; and
    sensing an object in the imaging path using an area sensor comprising a first plurality of lines of pixels, wherein the area sensor is configured to sense with only a second plurality of lines of pixels including fewer lines of pixels than the number of lines of pixels in the first plurality of lines of pixels.

12. The method of claim 11, wherein the first plurality of lines of pixels are aligned in parallel with a direction of movement of the object being sensed.

13. The method of claim 11, further comprising folding the illumination pattern using a plurality of reflective surfaces.

14. The method of claim 11, wherein the optical device includes an optical filter in at least one of the imaging path and the illumination path.

15. The method of claim 11, wherein the illumination pattern is generated using a plurality of illumination devices.

16. The method of claim 15, wherein the plurality of illumination devices are integrated into the optical device.

17. A folding attachment device for an existing optical imaging device, existing optical imaging device comprising an area sensor; the folding attachment device comprising:
    a folded optical path portion, the folded optical path portion configured to fold an optical path of the area sensor of the optical imaging device, the area sensor having a first plurality of lines of pixels and configured to sense with only a second plurality of lines of pixels, wherein the second plurality of lines of pixels are arranged in a windowed portion of the area sensor and includes fewer lines of pixels than the number of lines of pixels in the first plurality of lines of pixels; and a line shaped illumination pattern generator, the line shaped illumination pattern generator correlating to a windowed portion of the area sensor of the optical imaging device.

18. The device of claim 17, wherein the line shaped illumination pattern generator includes at least one of a beam splitter and a dichroic mirror.

19. The device of claim 17, further comprising a tilted exit window to reduce reflections into the device.

20. The device of claim 19, wherein the tilted exit window is tilted at approximately 15 to 30 degrees.

\* \* \* \* \*